United States Patent
Allard et al.

[15] 3,682,273
[45] Aug. 8, 1972

[54] LUBRICATING APPARATUS FOR HEAVY MACHINERY

[72] Inventors: Eusebe Allard; Julien Allard, both of 500 rue St. Jean Baptiste; Roland Allard, 254 rue Mgr. Poirier, all of Princeville, Quebec, Canada

[22] Filed: Oct. 20, 1970

[21] Appl. No.: 82,390

[52] U.S. Cl. ............................184/27 A, 184/6.4
[51] Int. Cl. ........................F16n 13/10, F01m 1/22
[58] Field of Search .......184/27 R, 27 A, 71, 74, 6.4, 184/37, 39, 29; 222/383, 384

[56] References Cited

UNITED STATES PATENTS

| | | |
|---|---|---|
| 2,960,185 | 11/1960 | Klein ......................184/27 X |
| 1,669,425 | 5/1928 | Scoville ..................184/27 A |
| 786,871 | 4/1905 | Callahan..................184/27 A |
| 2,164,273 | 6/1939 | Hodson ........................184/29 |
| 2,061,422 | 11/1936 | Gee ........................184/27 A |
| 2,475,075 | 7/1949 | Chancellor ..............184/27 A |

*Primary Examiner*—Manuel A. Antonakas
*Attorney*—Raymond A. Robic

[57] ABSTRACT

A mechanical greasing apparatus is reservoir, for lubricating heavy machinery. The apparatus comprises a grease reseroivr, a piston cylinder arrangement coupled to the grease reservoir, which is adapted to deliver a continuous flow of grease, and a grease pipe connected to the piston cylinder arrangement to receive the continuous flow of grease from the piston cylinder arrangement. The piston cylinder arrangement is usually operated by an electric power motor.

4 Claims, 4 Drawing Figures

PATENTED AUG 8 1972

INVENTORS
Eusebe ALLARD
Julien ALLARD
Roland ALLARD

ATTORNEY

LUBRICATING APPARATUS FOR HEAVY MACHINERY

This invention relates to a mechanical greasing apparatus. More particularly, this invention is directed to a machine adapted to be used for lubricating excavating shovels, bulldozers, and the like heavy machinery.

Heavy machinery of the type listed above requires a lot of maintenance, one aspect being the frequent lubrication which is necessitated by the everyday use of such device. It will readily be understood that manual lubrication is out of the question in this age of high productivity. On the other hand, the more or less mechanized greasing devices which have been or are currently available are not completely satisfactory mainly because they have not been designed for this purpose in mind.

In order to overcome the above disadvantages we have invented a mechanical greasing apparatus which comprises a grease reservoir and a piston cylinder arrangement coupled to the grease reservoir and adapted to deliver a continuous flow of grease. A grease pipe is connected to the piston cylinder arrangement to receive the continuous flow of grease from the piston cylinder arrangement. The piston cylinder arrangement is usually operated by an electric power motor.

In the drawings which illustrate an embodiment of the invention,

Figure 1:
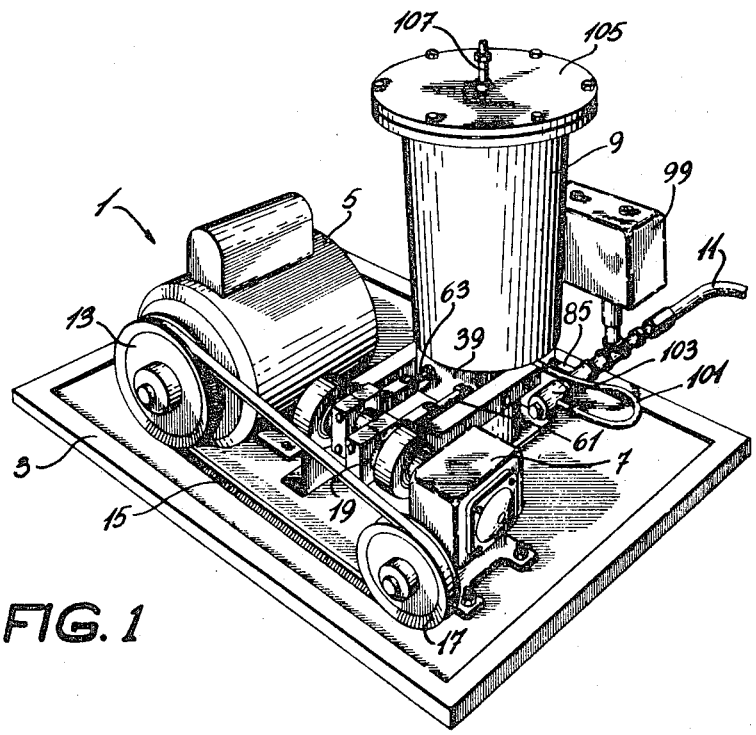
FIG. 1 is a perspective view of a mechanical greasing apparatus.
Figure 2:
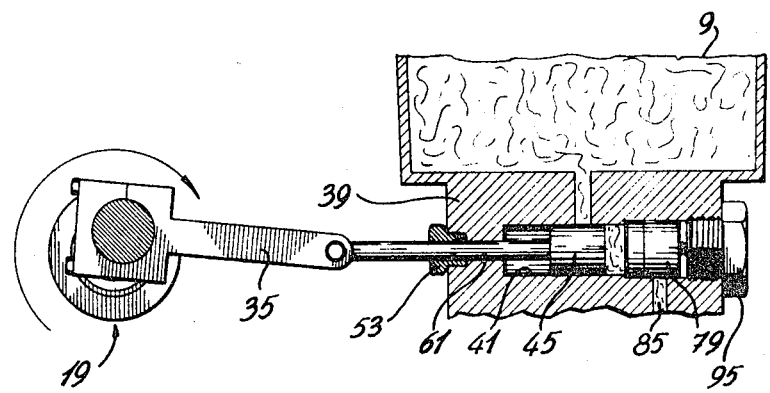
FIG. 2 is a section taken through the bottom portion of the grease reservoir also showing a cylinder and the piston connected to the crank shaft.

Referring to the drawings, the mechanical greasing apparatus 1 which has been illustrated is mounted on a base 3, and generally comprises an electric power motor 5, a speed reducer 7, a grease reservoir 9 and a grease pipe 11. The electric power motor 5 is adapted to rotate a V-type pulley 13 over which runs a V-belt 15. The V-belt 15 operates to run over a second V-type pulley 17 which transmits power to the speed reducer 7. Power is then transmitted from the speed reducer 7 to the crank shaft 19 which will be responsible for the main operation of the mechanical greasing apparatus 1.

Figure 3:
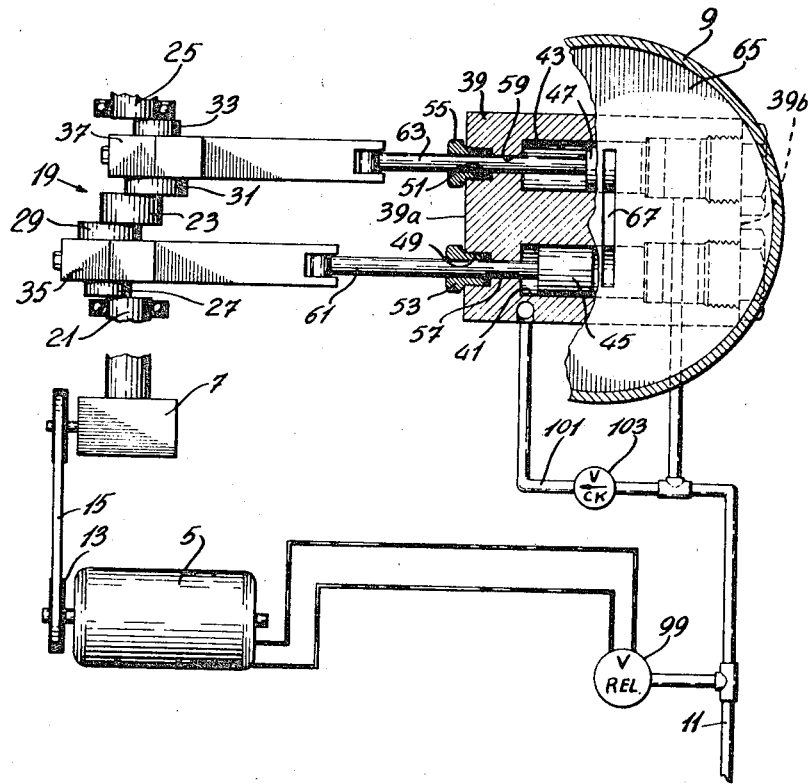
FIG. 3 is a schematic representation of the device according to the invention.

The crank shaft 19 comprises three (3) bearings 21, 23 and 25 all mounted in the manner illustrated in FIG. 3 of the drawings, and discs 27, 29 and 31, 33 respectively for reciprocably moving connecting rods 35 and 37. It will be seen that the particular construction of the crank shaft 19 will enable an alternate movement of the connecting rods. This will serve a definite purpose for the operation of the mechanical greasing apparatus 1 as will be explained more in details hereinbelow.

Underneath the grease reservoir 9, there is a cylinder block 39 over which the reservoir in mounted. The cylinder block 39 is shaped to define two cylinders 41 and 43 as particularly illustrated in FIG. 3 of the drawings. Two pistons 45 and 47 are movable respectively in cylinders 41 and 43. On the crank shaft side 39a of the cylinder block 39, the latter has two threaded openings 49 and 51 into which are screwed two bored threaded plugs 53 and 55. The threaded openings 49 and 51 and the cylinders 41 and 43 are in respective communication by means of the axial bores 57 and 59. This will allow the piston rods 61 and 63 to move through the openings 49 and 51 and the axial bores 57 and 59 and to connect them to pistons 45 and 47 while allowing them to move reciprocably inside the cylinder block 39.

As illustrated, the piston rods 61 and 63 are articulated respectively to connecting rods 35 and 37. Since the connecting rods move alternately because of the particular construction of the crank shaft 19, it will readily be understood that the pistons 45 and 47 will also move alternately inside cylinders 41 and 43.

Figure 4:
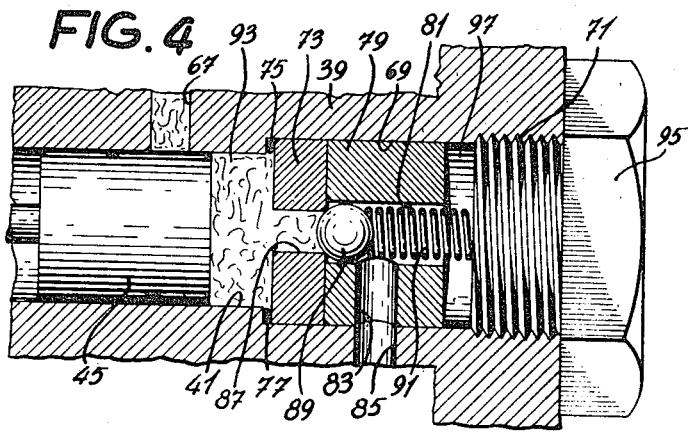
FIG. 4 is a section view of a cylinder and piston.

We shall now describe in details with particular reference to FIG. 4 of the drawings, the construction of one piston-cylinder arrangement, it being understood that both piston-cylinder arrangements are identical. We shall describe the arrangement including piston 45 and cylinder 41, but beforehand we must state that the bottom floor 65 of the grease reservoir 9 is formed with a longitudinal channel 67 which extends through the cylinder block 39 and opens in both cylinders 41 and 43. Immediately adjacent the cylinder 45 there is an enlarged cylindrical bore 69 which extends to the opposite side 39b of the cylinder block 39 and is terminated by a threaded portion 71. A bored narrow check valve seat 73 is mounted in bore 69 immediately adjacent cylinder 41, after having disposed O-ring 75 between the check valve seat 73 and the shoulder 77 which separates the cylinder 41 and the bore 69. A cylindrical check valve housing 79 is mounted inside bore 69 next to the check valve seat. With reference to FIG. 4, it will be seen that the check valve housing 73 is formed with an axial bore 81 and a transverse bore 83 which leads into grease outlet 85 the latter being formed in the cylinder block 39 and being in communication with grease pipe 11. It must be remembered that bore 81 has a larger diameter than the bore 87 of the bored check valve seat 73. The reason for the two different diameters of bores 81 and 87 is to permit the ball 89 to move axially inside bore 81 while being capable of plugging bore 87 when urged to do so by the spring 91. Referring to FIG. 4 it will be seen that the check valve which is used to prevent re-entry of the grease 93 in cylinder 41 when the piston 45 moves towards a retracted position, merely consists of ball 89 and spring 91. The piston cylinder arrangement finally comprises a plug 95 which is terminated by a disc 97, the latter being used to tighten check valve seat 73 and check valve housing 79 against one another in the bore 69. It will be realized that one end of the spring 91 is fixed to the disc 97.

Alongside the grease pipe 11 there is mounted a security pressure relief valve 99 for the purpose of stopping the motor 5, and consequently pistons 45 and 47, when the pressure inside the grease pipe 11 exceeds a predetermined value. There is a second grease pipe 101 which is mounted between the grease reservoir 9 and the grease pipe 11. Alongside the grease pipe 101, there is an excess grease return valve 103 and its purpose is to return to the reservoir 9 the excess grease contained in grease pipe 11.

Finally the grease reservoir 9 is formed with a cover 105 which is bolted on top of the reservoir, and an air pressure inlet 107 on the cover 105. The air pressure inlet will serve to create a pressure inside the reservoir 9 when it is intended or required to force the grease 93 into the cylinders 41 and 43, especially when the weather is cold.

When the motor 5 starts, both pistons 45 and 47 will immediately start to reciprocate alternately in cylinders 41 and 43. Let us consider FIG. 4. It will be realized that the piston 45 is being retracted while creating a certain vacuum inside the cylinder 41 and bore 87. At the same time, the spring 91 urges the ball 89 against the opening of the bore 87 which will tend to influence the production of said vacuum. As soon as the piston has retracted far enough to open channel 67, the grease 93 will start to fill the cylinder and the bore 87. When the piston starts again to extend, the pressure created by the piston will force the ball 89 away from the entrance of the bore 87 and the grease will be forced into the transverse bore 83, grease outlet 85 and finally into grease tube 11 from which it will be use to lubricate a heavy piece of equipment.

A continuous flow of grease in tube 11 is assured by the alternate movement of both pistons 45 and 47.

I claim:

1. A lubricating apparatus comprising:
   a. a grease reservoir,
   b. a pair of cylinders coupled to said grease reservoir,
   c. a movable piston inside each cylinder to deliver a continuous flow of grease from said grease reservoir,
   d. said piston mounted at the end of a piston rod,
   e. the other end of said piston rod articulated to a connecting rod, said connecting rod operatively connected to a crankshaft,
   f. an electric motor operatively connected to said crankshaft via a speed reducer,
   g. said crankshaft causing alternate movement of said movable pistons,
   h. a longitudinal channel formed at the bottom of said grease reservoir, said channel serving as grease inlet into said cylinders by opening into both of said cylinders,
   i. a first grease pipe connected to said cylinders to receive said continuous flow of grease from said cylinders,
   j. a grease outlet for each of said cylinders connected to said first grease pipe,
   k. a bored narrow check valve seat mounted into said cylinder to face said piston when the latter is in said extended position and a cylindrical check valve housing adjacent said bored narrow check valve seat, said cylindrical check valve housing formed with a bore of larger diameter than the bore in said check valve seat, said bore of said check valve housing in communication with said grease outlet,
   l. said check valve comprising a ball movable inside the bore of said check valve housing and capable of plugging the opening of said bore in said check valve seat and a check valve spring to urge said ball in said opening when said piston is moving towards a retracted position,
   m. whereby said longitudinal channel and said grease outlet are disposed in such a manner relative to said cylinder that when said piston is moved to said retracted position inside said cylinder, grease is allowed to be introduced in said cylinder and when said piston is moved to an extended position, said grease is expelled from said cylinder by said grease outlet, said alternate movement of said pistons causing a continuous flow of said grease in said grease pipe.

2. A mechanical greasing apparatus according to claim 1, in which a security pressure relief valve is mounted along said first grease pipe to stop the operation of said means defined in (d) when the pressure inside said grease pipe exceeds a predetermined value.

3. A mechanical greasing apparatus according to claim 1, in which an air pressure inlet is provided on said grease reservoir, said air pressure inlet serving to create a pressure inside said reservoir in order to force said grease into said piston cylinder means.

4. A mechanical greasing apparatus according to claim 1, which comprises a second grease pipe connected between said grease reservoir and said first grease pipe and an excess grease return valve mounted along said second grease pipe to return excess grease in said grease reservoir when said apparatus is not in operation.

* * * * *